Sept. 20, 1966 L. R. SHURTZ 3,273,929
GARDEN TOOL FOR REMOVING WEEDS
Filed July 27, 1964
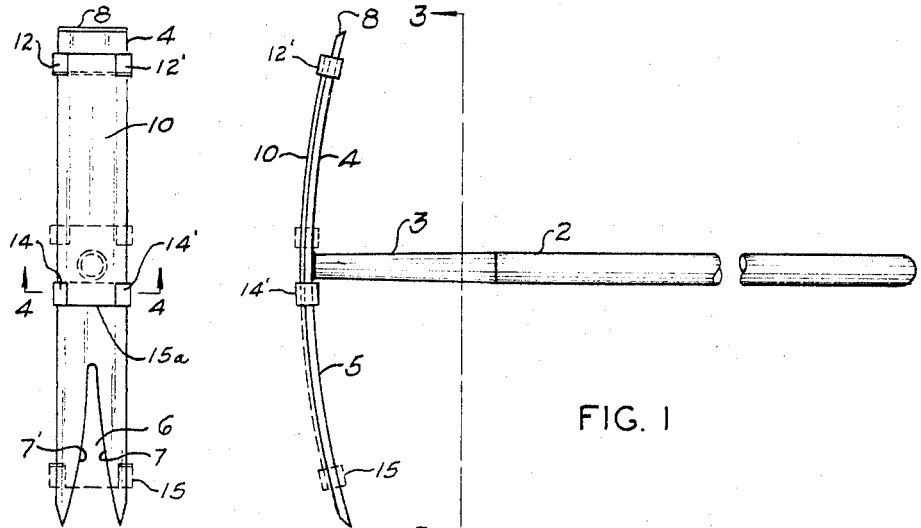
FIG. 1
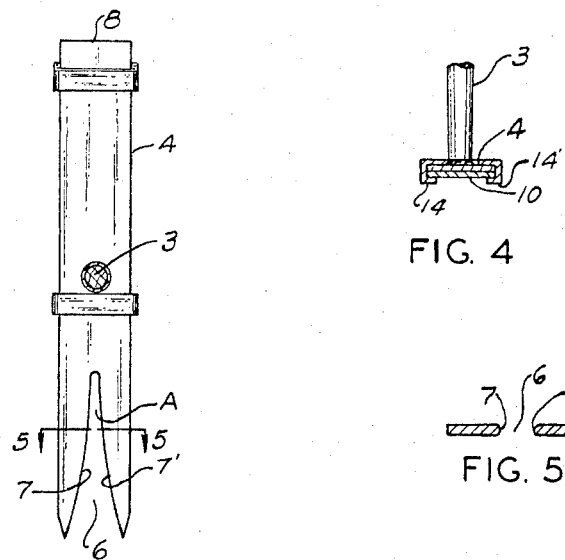
FIG. 2
FIG. 3
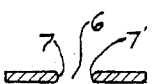
FIG. 4
FIG. 5
INVENTOR
Lawerence R. Shurtz
BY Scott L. Norviel
Atty

United States Patent Office 3,273,929
Patented Sept. 20, 1966

3,273,929
GARDEN TOOL FOR REMOVING WEEDS
Lawrence R. Shurtz, 858 W. 8th St., Mesa, Ariz.
Filed July 27, 1964, Ser. No. 385,376
1 Claim. (Cl. 294—50)

This invention concerns garden tools, more particularly tools for removing weeds from lawns and the like.

One of the objects of the invention is to provide a weed pulling device that can be used when the operator is standing and will pull weeds growing in a lawn or the like.

Another object is to provide a tool having a head with a weed puller attachment and a sliding knocker that will remove weeds caught in the pulling part of the device from the head, and drop them in a pile or into a wheelbarrow.

Another object is to provide a weed puller having a comparatively long handle and a shank at the bottom of the handle to which a puller and cutter is attached; said puller and cutter having a curved cutting blade with a V-shaped pulling slot at one end and a squared hoe at the other.

Still another object is to provide a weed puller having a transversely disposed weed puller attached to the ferrule end of a handle; said cutter and puller having a V-shaped notch, rounded edges at one end and a squared hoe cutter at the other end, and a knocker slidably attached to the transverse head having stops to limit its travel in either direction and having cleats to render it slidable on the head portion.

Still another object includes the provision of a somewhat curved portion applied to the said hoe-cutter.

I attain the foregoing by means of the devices, parts, and combinations of parts shown in the accompanying drawings, in which FIGURE 1 is a side elevational view of the entire implement or tool;

FIGURE 2 is a bottom end view of the tool showing the bottom face of the weed puller-cutter;

FIGURE 3 is a top view of the weed puller-cutter with the handle sectioned off on line 3—3 of FIGURE 1 to better show the complete construction; and FIGURE 4 is a view of the hoe cutter-puller shown in section substantially on line 4—4 of FIGURE 4; and FIGURE 5 is a section taken substantially on line 5—5 of FIGURE 5.

Similar numerals refer to similar parts in the several views.

As shown in the accompanying drawings, numeral 2 indicates the handle of the entire tool. Numeral 3 indicates the lower portion or the ferrule of the handle. This is fitted onto the tool head 4 by insertion of an axially positioned spike 3 driven into the ferrule portion of the handle. The body 5 of the head is made of flat comparatively thin steel and is curved, as shown particularly in FIGURE 1, with its end portions curved upward toward the top of handle 2.

In the approximate center of one end of the head there is a V-shaped slot marked 6. This has rounded curved side edges marked 7 and 7'. The opposite end 8 of the head is formed at right angles to the length of the head. This is sharpened and may be termed the hoe end.

An important part of the head is the sliding knocker 10. This is made of a piece of flat metal which is longitudinally curved to correspond with the curve of the head 4. At the ends of the knocker there are crossbars 12 and 14. Each of the crossbars is bent and folded over at each end to form guides so that the entire knocker body slides easily from the position shown in FIGURES 2 and 3 to the position indicated by dotted lines 15, FIGURES 1 and 2. As the knocker is moved toward the end positions shown in FIGURE 1, it is stopped by contact of the crossbars 14 and 14' with the bottom of the ferrule 3. The ends are bent so that the entire knocker will slide freely from and to either end of its travel. The user can slide the knocker by merely shaking the head 4. The weight of the knocker will move it to the lower end of the hoe head 5, or optionally, the knocker may be moved by striking the shank of the ferrule against some solid object, or it may be moved in any other convenient manner.

In use the tool (or implement) is grasped by the handle 2 and a weed which is to be removed is struck with the head so that it slides up into slot 6 until it occupies position A, FIGURE 3. At this point it may be pulled by rocking the head on its curvature. Not always, but quite often, the root of the weed will stick in the slot 6 from which it may be removed by hand or with the knocker. If it is inconvenient simply to pull the weed out of the notch the user may position the tool with the slot end down and then cause the knocker to forcibly strike the weed as it moves from the position shown in FIGURE 3 to the position shown by dotted lines 15 in FIGURES 1 and 2. The end 15a of the knocker will then engage the weed in slot 6 and dislodge it. As soon as the weed is dislodged it falls out because the slot widens as it approaches the end of the head. The weeds released may be placed in a pile as desired.

I claim:

A garden tool for removing weeds comprising an elongated flat head plate of rectangular configuration and longitudinally curved with a centrally disposed handle extending at a right angle from one face of said head plate, one end of said head plate having a V notch with the sides thereof converging inwardly from the end edge thereof, and a slidable knocker plate of rectangular configuration and longitudinally curved, transverse crossbars secured to opposite ends of said knocker plate with the opposite ends of said bars folded over and around the opposite side edges of said head plate to permit slidable movement of said knocker plate on said head plate, said crossbars being disposed on opposite sides of the jointure of said central handle with said head plate to limit slidable movement of said knocker plate along the longitudinal axis of said head plate, said knocker plate being substantially shorter than said head plate to knock weeds out of said V notch when said tool is shaken.

References Cited by the Examiner
UNITED STATES PATENTS
1,632,883   6/1927   Carkey _____ 172—380 X
2,140,911  12/1938   James.

GERALD M. FORLENZA, *Primary Examiner.*
R. G. SHERIDAN, *Assistant Examiner.*